United States Patent
Kobilka et al.

(10) Patent No.: US 9,676,893 B2
(45) Date of Patent: Jun. 13, 2017

(54) POLYURETHANE MATERIALS FORMED FROM EPOXIDIZED PLANT OILS

(71) Applicant: International Business Machines Corporation, Armonk, NY (US)

(72) Inventors: Brandon M. Kobilka, Tucson, AZ (US); Joseph Kuczynski, North Port, FL (US); Timothy C. Mauldin, San Diego, CA (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/862,847

(22) Filed: Sep. 23, 2015

(65) Prior Publication Data

US 2017/0081460 A1  Mar. 23, 2017

(51) Int. Cl.
C08G 71/04 (2006.01)
C08G 18/02 (2006.01)
E04B 1/82 (2006.01)
C08G 18/38 (2006.01)

(52) U.S. Cl.
CPC ......... *C08G 18/02* (2013.01); *C08G 18/3836* (2013.01); *C08G 71/04* (2013.01); *E04B 1/82* (2013.01)

(58) Field of Classification Search
CPC ........ C08G 71/04; C08G 18/85; C08G 18/36; C08G 18/348; C08G 18/4283; C08G 18/701
See application file for complete search history.

(56) References Cited

U.S. PATENT DOCUMENTS

| | | | |
|---|---|---|---|
| 3,070,608 A * | 12/1962 | Kuester | C07D 303/42 549/539 |
| 6,433,121 B1 | 8/2002 | Petrovic et al. | |
| 7,544,763 B2 | 6/2009 | Kazemizadeh et al. | |
| 8,217,193 B2 | 7/2012 | Narayan et al. | |
| 2008/0302694 A1 | 12/2008 | Gardner et al. | |
| 2010/0197878 A1 | 8/2010 | Casati et al. | |

(Continued)

FOREIGN PATENT DOCUMENTS

WO  2009048927 A1  4/2009

OTHER PUBLICATIONS

Hojabri, L.; Kong, X.; Narine, S. S. Functional thermoplastics from linear diols and diisocyanates produced entirely from renewable lipid sources. Biomacromolecules, 2010,11, pp. 911-918.*

(Continued)

*Primary Examiner* — Robert C Boyle
*Assistant Examiner* — Stephen Rieth
(74) *Attorney, Agent, or Firm* — Patterson + Sheridan, LLP

(57) ABSTRACT

In an example, a process of forming a polyurethane material is disclosed. The process includes forming carboxylic acid-terminated aliphatic polyol molecules from an epoxidized plant oil. The process also includes chemically reacting the carboxylic acid-terminated aliphatic polyol molecules with an azide material to form monoisocyanate-functionalized aliphatic polyol molecules. The process further includes polymerizing the monoisocyanate-functionalized aliphatic polyol molecules to form a first polyurethane material.

17 Claims, 2 Drawing Sheets

(56) References Cited

U.S. PATENT DOCUMENTS

Figure 1:
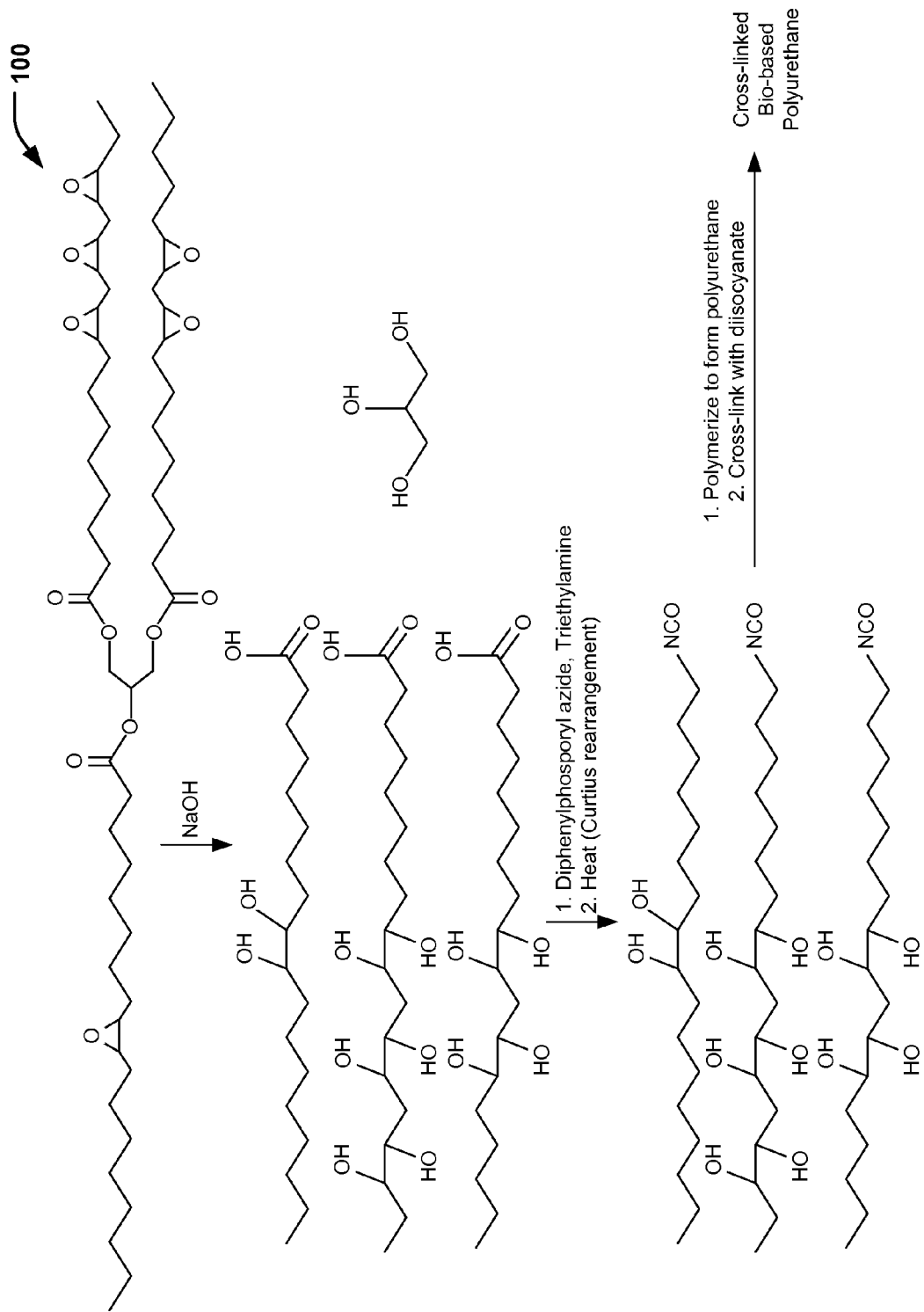

2011/0065821 A1 3/2011 Abraham et al.
2012/0264901 A1* 10/2012 Cramail ................ C08G 71/04
526/301
2015/0051304 A1 2/2015 Shieh

OTHER PUBLICATIONS

Shioiri, T.; Ninomiya, K.; Yamada, S. Diphenylphosphoryl Azide: A new convenient reagent for a modified Curtius reaction and for the peptide synthesis. Journal of the American Chemical Society, 1972, 94, pp. 6203-6205.*
Methyl Oleate Information. PubChem. https://pubchem.ncbi.nlm.nih.gov/compound/methyl_oleate. As viewed on Jul. 18, 2016.*
Popa, V-M.; Gruia, A.; Raba, D-N.; Dumbrava, D.; Moldovan, C.; Bordean, D.; Mateescu, C.; Fatty acids composition and oil characteristics of linseed (*Linum usitatissiumum* L.) from Romania. Journal of Agroalimentary Processes and Technologies, 2012, 18, pp. 136-140.*
DiLauro, et al., "Use of Catalytic Fluoride Under Neutral Conditions for Cleaving Silicon-Oxygen Bonds", The Journal of Organic Chemistry, American Chemical Society, 2011, pp. 7352-7358.
Zhang, et al., "Reduction of Epoxidized Vegetable Oils: A Novel Method to Prepare Bio-Based Polyols for Polyurethanes", Macromolecular Rapid Communications, 2014, pp. 1068-1074.

* cited by examiner

POLYURETHANE MATERIALS FORMED FROM EPOXIDIZED PLANT OILS

I. FIELD OF THE DISCLOSURE

The present disclosure relates generally to polyurethane materials formed from epoxidized plant oils.

II. BACKGROUND

Epoxidized vegetable oils are produced commercially at large volumes, typically but not exclusively from soybean and linseed oil. These oil derivatives are predominantly used as an additive to capture liberated hydrochloric acid in polyvinyl chloride (PVC) based materials and to a lesser extent as a precursor to polyols. In some cases, such vegetable oil-based polyols may be used as derivatives for polyurethanes. However, these polyols typically produce polyurethanes with poor mechanical properties compared to petroleum-based polyurethanes.

III. SUMMARY OF THE DISCLOSURE

According to an embodiment, a process of forming a polyurethane material is disclosed. The process includes forming carboxylic acid-terminated aliphatic polyol molecules from an epoxidized plant oil. The process also includes chemically reacting the carboxylic acid-terminated aliphatic polyol molecules with an azide material to form monoisocyanate-functionalized aliphatic polyol molecules. The process further includes polymerizing a mixture that includes the monoisocyanate-functionalized aliphatic polyol molecules to form a first polyurethane material.

According to another embodiment, a process of forming a polyurethane material is disclosed. The process includes forming carboxylic acid-terminated aliphatic polyol molecules from an epoxidized plant oil. The process includes chemically reacting the carboxylic acid-terminated aliphatic polyol molecules with an azide material to form monoisocyanate-functionalized aliphatic polyol molecules. The process also includes polymerizing a mixture that includes the monoisocyanate-functionalized aliphatic polyol molecules to form a first polyurethane material. The process further includes chemically reacting the first polyurethane material with a diisocyanate material to form a second polyurethane material.

According to another embodiment, an acoustic dampening foam is disclosed that includes a petroleum-based polyurethane material and a biologically-based polyurethane material. The biologically-based polyurethane material may be formed by a process that includes forming carboxylic acid-terminated aliphatic polyol molecules from an epoxidized plant oil. The process may include chemically reacting the carboxylic acid-terminated aliphatic polyol molecules with an azide material to form monoisocyanate-functionalized aliphatic polyol molecules. The process may also include polymerizing a mixture that includes the monoisocyanate-functionalized aliphatic polyol molecules to form a first polyurethane material. The process may further include chemically reacting the first polyurethane material with a diisocyanate cross-linking material to form the biologically-based polyurethane material.

One advantage of the present disclosure is the ability to form a polyurethane material having a variable degree of cross-linking from an epoxidized plant oil. Carboxylic acid-terminated aliphatic polyol molecules formed from the epoxidized plant oil may be used to form monomers that include multiple hydroxyl functional groups and an isocyanate functional group in a single molecule. As isocyanates are typically derived from petroleum, incorporation of the isocyanate groups into the polyol molecules may reduce dependence on non-renewable feedstocks. Further, in the present disclosure, the ring-opening reaction of the epoxide rings of the epoxidized plant oil may increase a number of hydroxyl groups that are subsequently available for cross-linking. The additional hydroxyl groups may allow a degree of cross-linking in a biologically-based polyurethane material to be adjusted, potentially providing improved mechanical properties compared to other bio-based polyurethane materials. The improved mechanical properties may allow for replacement of at least a portion of petroleum-based polyurethane materials in some applications.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 2:
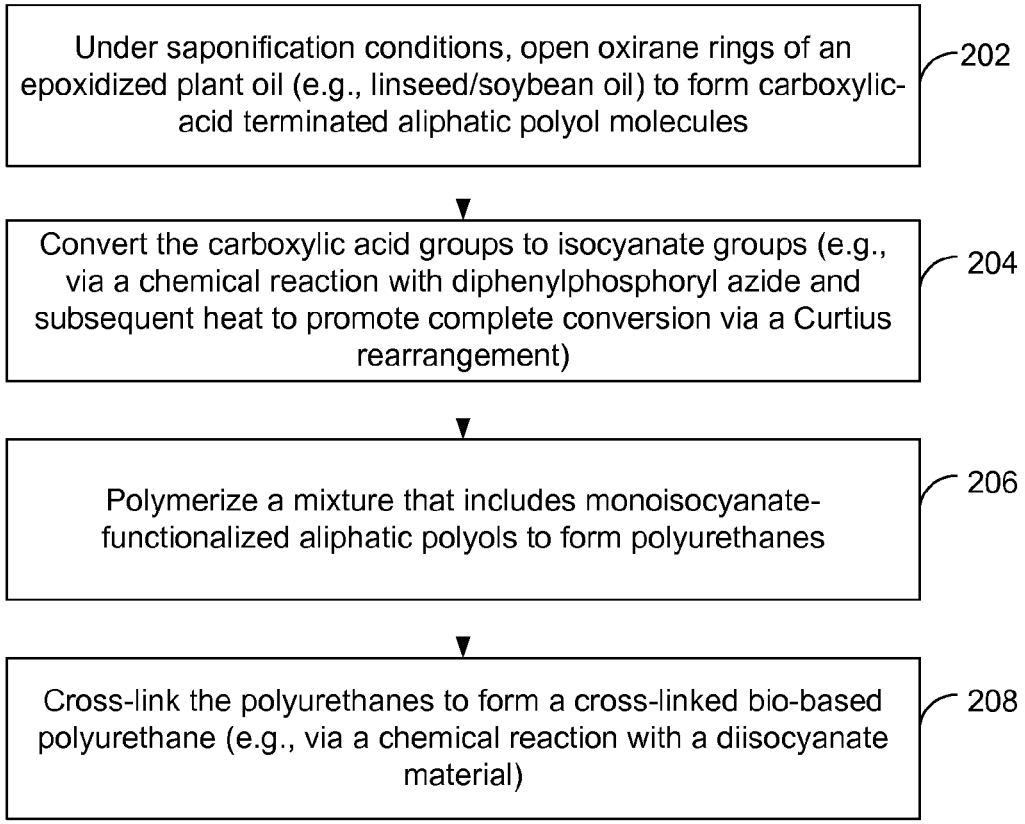

FIG. 1 is a chemical reaction diagram showing the preparation of a polyurethane material from an epoxidized plant oil, according to one embodiment; and FIG. 2 is a flow diagram showing a particular embodiment of a process of forming a polyurethane material from an epoxidized plant oil.

V. DETAILED DESCRIPTION

The present disclosure relates to polyurethane materials and methods of forming polyurethane materials from biologically-based materials (e.g., one or more epoxidized plant oils, such as linseed oil, soybean oil, castor oil, etc.). In the present disclosure, a process of forming a biologically-based polyurethane material may include opening oxirane rings of the epoxidized plant oil(s), liberating free hydroxyl groups, and reducing triglyceride esters to liberate an additional hydroxyl group per fatty acid. The latter hydroxyl groups (i.e., the hydroxyl groups from the ester reduction) are not formed in traditional ring-opened epoxidized vegetable oils. The increased number of hydroxyl groups may allow for greater flexibility with respect to a degree of cross-linking that may be possible during formation of a cross-linked biologically-based polyurethane material (e.g., for use as a biologically-based portion of an acoustic dampening foam).

Referring to FIG. 1, a chemical reaction diagram 100 illustrates the preparation of a polyurethane material from an epoxidized plant oil, according to an embodiment. In the example of FIG. 1, the epoxidized plant oil includes epoxidized linseed oil. In other cases, alternative and/or additional epoxidized plant oils (e.g., vegetable oils, such as soybean oil, castor oil, etc.) may be used. The first chemical reaction (proceeding from top to bottom) shown in FIG. 1 illustrates that the epoxidized plant oil may be used to form carboxylic acid-terminated aliphatic polyol molecules. The second chemical reaction shown in FIG. 1 illustrates that the carboxylic acid-terminated aliphatic polyol molecules may be chemically reacted with an azide material to form monoisocyanate-functionalized aliphatic polyol molecules. FIG. 1 further illustrates that the monoisocyanate-functionalized aliphatic polyol molecules may be polymerized to form a first polyurethane material. As described further herein, after polymerization, a subset of hydroxyl groups of the monoisocyanate-functionalized aliphatic polyol monomers may remain available as cross-linking sites during formation of the second polymeric material. Thus, the remaining hydroxyl groups may allow for formation of a biologically-based polyurethane material having a variable degree of cross-linking. The ability to adjust the degree of cross-linking may allow for formation of biologically-based polyurethane materials that have improved mechanical properties compared to other polyurethane materials.

The first chemical reaction of FIG. 1 illustrates hydrolysis of the epoxide groups of an epoxidized plant oil molecule (e.g., linseed oil, in this example). FIG. 1 illustrates that a ring opening reaction of an oxirane ring of the epoxidized plant oil may result in the formation of two hydroxyl groups in an associated carboxylic acid-terminated polyol molecule. FIG. 1 illustrates that multiple sets of carboxylic-acid terminated aliphatic polyol molecules may be formed from the epoxidized linseed oil under saponification conditions (e.g., NaOH). Thus, FIG. 1 illustrates an example of a ring-opening procedure (under saponification conditions) in which hydrolysis of the epoxide groups of an epoxidized plant oil molecule may result in the formation of two hydroxyl groups per oxirane ring, compared to ring-opening processes that result in formation of a single hydroxyl group per oxirane ring.

To illustrate, a first portion of the epoxidized linseed oil molecule has one epoxide ring (shown on the left side of the epoxidized linseed oil molecule). A second portion of the epoxidized linseed oil molecule has three epoxide rings (shown on the top right side of the epoxidized linseed oil molecule). A third portion of the epoxidized linseed oil molecule has two epoxide rings (shown on the bottom right side of the epoxidized linseed oil molecule).

In the example of FIG. 1, a first set of carboxylic acid-terminated aliphatic polyol molecules may have two hydroxyl groups and one carboxylic acid group (e.g., the first carboxylic-acid terminated aliphatic polyol molecule illustrated below the epoxidized linseed oil molecule in FIG. 1). Thus, FIG. 1 illustrates an example in which, under saponification conditions, a ring-opening reaction of one oxirane ring of a first portion of an epoxidized plant oil molecule results in a carboxylic acid-terminated aliphatic polyol molecule having two hydroxyl groups and one carboxylic acid group. Compared to a ring-opening reaction resulting in the formation of one hydroxyl group per oxirane ring (one oxirane ring in this case), the ring-opening reaction of FIG. 1 may provide one additional location for cross-linking during formation of a cross-linked biologically-based polyurethane material.

FIG. 1 also illustrates that a second set of carboxylic acid-terminated aliphatic polyol molecules may have six hydroxyl groups and one carboxylic acid group (e.g., the carboxylic-acid terminated aliphatic polyol molecule illustrated below the first carboxylic-acid terminated aliphatic polyol molecule). Thus, FIG. 1 illustrates an example in which, under saponification conditions, a ring-opening reaction of three oxirane rings of a second portion of an epoxidized plant oil molecule results in a carboxylic acid-terminated aliphatic polyol molecule having six hydroxyl groups and one carboxylic acid group. Compared to a ring-opening reaction resulting in the formation of one hydroxyl group per oxirane ring (three oxirane rings in this case), the ring-opening reaction of FIG. 1 may provide three additional locations for cross-linking during formation of a cross-linked biologically-based polyurethane material.

FIG. 1 further illustrates that a third set of carboxylic acid-terminated aliphatic polyol molecules may have four hydroxyl groups and one carboxylic acid group (e.g., the carboxylic-acid terminated aliphatic polyol molecule illustrated below the second carboxylic-acid terminated aliphatic polyol molecule). Thus, FIG. 1 illustrates an example in which, under saponification conditions, a ring-opening reaction of two oxirane rings of a third portion of an epoxidized plant oil molecule results in a carboxylic acid-terminated aliphatic polyol molecule having four hydroxyl groups and one carboxylic group. Compared to a ring-opening reaction resulting in the formation of one hydroxyl group per oxirane ring (two oxirane rings in this case), the ring-opening reaction of FIG. 1 may provide two additional locations for cross-linking during formation of a cross-linked biologically-based polyurethane material.

FIG. 1 further illustrates that the ring-opening reaction results in formation of a glycerol byproduct. In some cases, the glycerol byproduct may be retained during subsequent polymerization, providing additional hydroxyl groups for cross-linking. In other cases, the glycerol byproduct may be removed prior to polymerization.

Prophetic Example: Hydrolysis of Epoxides

As a prophetic example, epoxidized vegetable oil (e.g., epoxidized linseed oil) may be combined with an aqueous solution of 2M sodium hydroxide (10-100 weight percent) in an autoclave or similar pressure vessel. While stirring, the reaction mixture may be slowly heated to about 180° C. The reaction may be maintained until the reaction is complete and all oxiranes are hydrolyzed. The reaction may then be cooled to room temperature. Purification may be carried out by solvent extraction, phase separation, or other techniques.

FIG. 1 further illustrates that the carboxylic acid-terminated aliphatic polyol molecules may be chemically reacted with an azide material to form monoisocyanate-functionalized aliphatic polyol molecules. In a particular embodiment, the azide material includes diphenylphosphoryl azide. While not shown in FIG. 1, chemically reacting the carboxylic acid-terminated aliphatic polyol molecules with the azide material may result in formation of acid azide molecules as an intermediate material. The acid azide molecules may undergo a Curtius rearrangement to form the monoisocyanate-functionalized aliphatic polyol molecules illustrated in FIG. 1. In some cases, the azide material may be removed prior to polymerization of a mixture that includes the monoisocyanate-functionalized aliphatic polyol molecules.

While not shown in the example of FIG. 1, in some cases, the hydroxyl groups of the carboxylic acid-terminated aliphatic polyols may be protected after saponification (e.g., to prevent side reactions that may be possible during a Curtius rearrangement). As an illustrative example, a protecting group such as a trialkylsilane may be added prior to the Curtius rearrangement and subsequently removed.

FIG. 1 illustrates that a first set of monoisocyanate-functionalized aliphatic polyol molecules may have two hydroxyl groups and one isocyanate group (e.g., the first monoisocyanate-functionalized aliphatic polyol molecule illustrated below the set of carboxylic acid-terminated aliphatic polyol molecules in FIG. 1). FIG. 1 also illustrates that a second set of monoisocyanate-functionalized aliphatic polyol molecules may have six hydroxyl groups and one isocyanate group (e.g., the monoisocyanate-functionalized aliphatic polyol molecule illustrated below the first monoisocyanate-functionalized aliphatic polyol molecule in FIG. 1). FIG. 1 further illustrates that a third set of monoisocyanate-functionalized aliphatic polyol molecules may have four hydroxyl groups and one isocyanate group (e.g., the monoisocyanate-functionalized aliphatic polyol molecule illustrated below the second monoisocyanate-functionalized aliphatic polyol molecule). Thus, FIG. 1 illustrates that the monoisocyanate-functionalized aliphatic polyol molecules may have an average aliphatic alkyl chain length that is in a range of 12 to 22 carbon atoms, such as in a range of 14 to 20 carbon atoms (e.g., 17 carbon atoms for the example of linseed oil illustrated in FIG. 1).

Prophetic Example: Preparation of Monoisocyanate-Functionalized Aliphatic Polyol Molecules As a prophetic example, diphenylphosphoryl azide and triethylamine (both as 1 molar equivalent for each equivalent carboxylic acid) may be added to a stirred solution of the hydrolyzed fatty acid mixture dissolved in dichloromethane. The reaction mixture may be heated to reflux for about 2 hours, cooled to room temperature, and rinsed with water (e.g., three times) and brine (e.g., one time), dried over magnesium sulfate, and the solvents may be removed in vacuo. The product may then be purified. For the Curtius rearrangement, as a first example, the acyl azide mixture may be placed in a nitrogen atmosphere and heated to about 100° C. until reaction completion. After cooling of the reaction mixture to room temperature, the product may be purified. As an alternative example, the acyl azide mixture may be dissolved in toluene (0.2M solution) and heated at about 65° C. for about 1-4 hours or until the reaction is complete. The solvent may be removed in vacuo, and the product may be dried under vacuum.

FIG. 1 further illustrates that a mixture that includes the monoisocyanate-functionalized aliphatic polyol molecules may be polymerized to form a first polyurethane material. As described further herein, the first polyurethane material may be reacted with a diisocyanate material to form a second polyurethane material. Illustrative examples of diisocyanate materials for use as cross-linking materials may include methylene diphenyl diisocyanate (MDI), toluene diisocyanate (TDI), hexamethylene diisocyanate (HDI), isophorone diisocyanate (IPDI), pentamethylene diisocyanate (PDI), or a combination thereof (among other alternatives).

As described further herein, a degree of cross-linking in the second polyurethane material may be controlled by adjusting an amount of diisocyanate material (e.g., stoichiometric or non-stoichiometric amounts) that is reacted with the first polyurethane material. To illustrate, a degree of polymerization of the first polyurethane material may be adjusted such that a subset of hydroxyl groups of a plurality of hydroxyl groups of the monoisocyanate-functionalized aliphatic polyol molecules remain available for chemical reaction with the diisocyanate material.

In a particular embodiment, the cross-linked biologically-based polyurethane formed according to the process illustrated in FIG. 1 may be used as a component of an acoustic dampening foam (e.g., for mainframe servers). For example, an acoustic dampening foam may include a petroleum-based polyurethane material and a biologically-based polyurethane material. A weight percentage of the biologically-based polyurethane material may be not less than 10 weight percent of the acoustic dampening foam. Thus, in some cases, the biologically-based polyurethane materials of the present disclosure may allow for a reduction in an amount of petroleum-based polyurethane materials while satisfying particular mechanical property standards. The weight percentage may be adjusted based on desired material properties for the acoustic dampening foam. Illustrative, non-limiting examples of desired material properties may include a density of about 2 pounds per cubic foot, a pore count of about 65-75 pores per inch, and a biological content of at least 10 weight percent. In the context of fabric-over-foam gaskets, a desired material property may be a compression set of less than 5 percent following compression to 50 percent of an initial thickness.

Thus, FIG. 1 illustrates an example of the preparation of polyurethane material from an epoxidized plant oil (e.g., linseed oil). In the ring-opening procedure of FIG. 1, hydrolysis of the epoxide groups of the epoxidized plant oil may result in the formation of two hydroxyl groups per oxirane ring, compared to ring-opening processes that result in formation of a single hydroxyl group per oxirane ring. The additional hydroxyl groups may represent additional locations for cross-linking during formation of a cross-linked biologically-based polyurethane material. The additional cross-linking locations may provide the ability to adjust a degree of cross-linking, allowing for formation of biologically-based polyurethane materials with mechanical properties that may be tailored for a specific application (e.g., for use as a component of an acoustic dampening foam).

Referring to FIG. 2, a particular embodiment of a process 200 of forming a polyurethane material is illustrated. In FIG. 2, carboxylic acid-terminated aliphatic polyol molecules may be formed from an epoxidized plant oil. The carboxylic acid-terminated polyol molecules may be chemically reacted with an azide material to form monoisocyanate-functionalized aliphatic polyol molecules. A mixture that includes the monoisocyanate-functionalized aliphatic polyol molecules may be polymerized to form a first polyurethane material. In the particular embodiment illustrated in FIG. 2, the first polyurethane material may be chemically reacted with a diisocyanate material to form a second polyurethane material (also referred to herein as a "cross-linked biologically-based polyurethane material"). By adjusting an amount of diisocyanate material that is chemically reacted with the first polyurethane material, a degree of cross-linking in the second polyurethane material may be adjusted (e.g., to tailor the mechanical properties for use as a component of an acoustic dampening foam, among other possible applications).

The process 200 includes, under saponification conditions, opening oxirane rings of an epoxidized plant oil to form carboxylic-acid terminated aliphatic polyol molecules, at 202. The ring-opening reaction results in the formation of one or more 1,2-diols and the conversion of triglyceride esters into carboxylic acid groups. For example, the first chemical reaction of FIG. 1 illustrates hydrolysis of the epoxide groups an epoxidized plant oil molecule (e.g., linseed oil). In FIG. 1, multiple sets of carboxylic-acid terminated aliphatic polyol molecules (having one or more 1,2 diol groups) may be formed from the epoxidized linseed oil under saponification conditions (e.g., NaOH).

The process 200 includes converting the carboxylic acid groups to isocyanate groups, at 204. The conversion may include a chemical reaction with an azide and subsequent heat in order to promote complete conversion via a Curtius rearrangement. For example, referring to FIG. 1, the carboxylic acid-terminated aliphatic polyol molecules may be chemically reacted with an azide material (e.g., diphenylphosphoryl azide) to form monoisocyanate-functionalized aliphatic polyol molecules. While not shown in FIG. 1, chemically reacting the carboxylic acid-terminated aliphatic polyol molecules with the azide material may result in formation of acid azide molecules as an intermediate material. The acid azide molecules may undergo a Curtius rearrangement (e.g., via application of heat) to form the monoisocyanate-functionalized aliphatic polyol molecules illustrated in FIG. 1.

The process 200 includes polymerizing a mixture that includes the monoisocyanate-functionalized aliphatic polyols to form polyurethanes, at 206. For example, referring to FIG. 1, a mixture that includes the monoisocyanate-functionalized aliphatic polyol molecules may be polymerized to form a first polyurethane material. In some cases, the glycerol byproduct formed during the ring-opening reaction may be retained and included in the mixture that is polymerized to form the first polyurethane material.

In the particular embodiment illustrated in FIG. 2, the process 200 includes cross-linking the polyurethanes to form a cross-linked bio-based polyurethane, at 208. The polyurethanes may be cross-linked via a chemical reaction with a diisocyanate material (or multiple diisocyanate materials). For example, referring to FIG. 1, the first polymeric material that is formed by polymerizing the monoisocyanate-functionalized aliphatic polyol molecules may be chemically reacted with MDI, TDI, HDI, IPDI, PDI, or a combination thereof (among other alternatives) to form the cross-linked bio-based polyurethane material.

Thus, FIG. 2 illustrates an example of a process of forming a cross-linked biologically-based polyurethane material via a chemical reaction of a first polymeric material formed from monoisocyanate-functionalized aliphatic polyols (e.g., formed according to the process described with respect to FIG. 1) with a diisocyanate material. An amount of diisocyanate material that is chemically reacted with the first polyurethane material may be adjusted in order to control a degree of cross-linking in the second polyurethane material (e.g., to tailor the mechanical properties for use as a component of an acoustic dampening foam, among other possible applications).

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process of forming a polyurethane material, the process comprising:
   forming carboxylic acid-terminated aliphatic polyol molecules from an epoxidized plant oil;
   chemically reacting the carboxylic acid-terminated aliphatic polyol molecules with an azide material to form monoisocyanate-functionalized aliphatic polyol molecules;
   performing a polymerization reaction using a mixture that includes the monoisocyanate-functionalized aliphatic polyol molecules to form a first polyurethane material; and
   chemically reacting the first polyurethane material with a diisocyanate material to form a second polyurethane material.

2. The process of claim 1, wherein the diisocyanate material includes methylene diphenyl diisocyanate (MDI), toluene diisocyanate (TDI), hexamethylene diisocyanate (HDI), isophorone diisocyanate (IPDI), pentamethylene diisocyanate (PDI), or a combination thereof.

3. The process of claim 1, wherein a ring opening reaction of an oxirane ring of the epoxidized plant oil results in the formation of two hydroxyl groups in an associated carboxylic acid-terminated aliphatic polyol molecule.

4. The process of claim 1, wherein the epoxidized plant oil includes epoxidized linseed oil.

5. The process of claim 1, wherein the carboxylic acid-terminated aliphatic polyol molecules are formed from the epoxidized plant oil under saponification conditions.

6. The process of claim 1, wherein chemically reacting the carboxylic acid-terminated aliphatic polyol molecules with the azide material includes forming acid azide molecules as an intermediate material, and wherein the acid azide molecules undergo a Curtius rearrangement to form the monoisocyanate-functionalized aliphatic polyol molecules.

7. The process of 1, wherein the azide material includes diphenylphosphoryl azide.

8. The process of claim 1, wherein a glycerol byproduct is formed from the epoxidized plant oil.

9. The process of claim 1, further comprising removing the azide material prior to polymerization.

10. The process of claim 1, wherein the monoisocyanate-functionalized aliphatic polyol molecules have an aliphatic alkyl chain length in a range of 12 to 22 carbon atoms.

11. A process of forming a polyurethane material, comprising:
   forming carboxylic acid-terminated aliphatic polyol molecules from an epoxidized plant oil including epoxidized linseed oil, wherein the carboxylic acid-terminated aliphatic polyol molecules formed from the epoxidized linseed oil include:
      a first set of carboxylic acid-terminated aliphatic polyol molecules having two hydroxyl groups and one carboxylic acid group;
      a second set of carboxylic acid-terminated aliphatic polyol molecules having six hydroxyl groups and one carboxylic acid group; and
      a third set of carboxylic acid-terminated aliphatic polyol molecules having four hydroxyl groups and one carboxylic acid group;
   chemically reacting the carboxylic acid-terminated aliphatic polyol molecules with an azide material to form monoisocyanate-functionalized aliphatic polyol molecules; and
   performing a polymerization reaction using a mixture that includes the monoisocyanate-functionalized aliphatic polyol molecules to form a first polyurethane material.

12. A process of forming a polyurethane material, comprising:
   forming carboxylic acid-terminated aliphatic polyol molecules, along with a glycerol byproduct, from an epoxidized plant oil;
   chemically reacting the carboxylic acid-terminated aliphatic polyol molecules with an azide material to form monoisocyanate-functionalized aliphatic polyol molecules; and
   performing a polymerization reaction using a mixture that includes the monoisocyanate-functionalized aliphatic polyol molecules to form a first polyurethane material, wherein the mixture that includes the monoisocyanate-functionalized aliphatic polyol molecules further includes the glycerol byproduct.

13. A process of forming a polyurethane material, comprising:
   forming carboxylic acid-terminated aliphatic polyol molecules from an epoxidized plant oil;

chemically reacting the carboxylic acid-terminated aliphatic polyol molecules with an azide material to form monoisocyanate-functionalized aliphatic polyol molecules;

performing a polymerization reaction using a mixture that includes the monoisocyanate-functionalized aliphatic polyol molecules to form a first polyurethane material;

chemically reacting the first polyurethane material with a diisocyanate material to form a second polyurethane material; and adjusting a degree of cross-linking of the second polyurethane material by adjusting an amount of the diisocyanate material that is chemically reacted with the first polyurethane material.

14. A process of forming a polyurethane material, comprising:

forming carboxylic acid-terminated aliphatic polyol molecules from an epoxidized plant oil;

chemically reacting the carboxylic acid-terminated aliphatic polyol molecules with an azide material to form monoisocyanate-functionalized aliphatic polyol molecules;

performing a polymerization reaction using a mixture that includes the monoisocyanate-functionalized aliphatic polyol molecules to form a first polyurethane material;

chemically reacting the first polyurethane material with a diisocyanate material to form a second polyurethane material; and adjusting a degree of polymerization of the first polyurethane material such that a subset of hydroxyl groups of a plurality of hydroxyl groups of the monoisocyanate-functionalized aliphatic polyol molecules remain available for chemical reaction with the diisocyanate material.

15. An acoustic dampening foam comprising:
a petroleum-based polyurethane material; and
a biologically-based polyurethane material formed by a process that includes:

forming carboxylic acid-terminated aliphatic polyol molecules from an epoxidized plant oil;

chemically reacting the carboxylic acid-terminated polyol molecules with an azide material to form monoisocyanate-functionalized aliphatic polyol molecules;

polymerizing a mixture that includes the monoisocyanate-functionalized aliphatic polyol molecules to form a first polyurethane material; and chemically reacting the first polyurethane material with a diisocyanate cross-linking material to form the biologically-based polyurethane material.

16. The acoustic dampening foam of claim 15, wherein the biologically-based polyurethane material is not less than 10 weight percent of the acoustic dampening foam.

17. The acoustic dampening foam of claim 15, wherein an average aliphatic alkyl chain length of the monoisocyanate-functionalized aliphatic polyol molecules is in a range of 14 to 20 carbon atoms.

* * * * *